United States Patent
Hsueh et al.

(10) Patent No.: US 8,446,361 B2
(45) Date of Patent: May 21, 2013

(54) CONTROL METHOD, CIRCUIT, AND ELECTRONIC SYSTEM UTILIZING THE SAME

(75) Inventors: Fu-Yuan Hsueh, Bade (TW); I-Lin Wu, Tainan (TW)

(73) Assignee: Chimei Innolux Corporation, Chu-Nan (TW)

( * ) Notice: Subject to any disclaimer, the term of this patent is extended or adjusted under 35 U.S.C. 154(b) by 1119 days.

(21) Appl. No.: 12/378,930

(22) Filed: Feb. 19, 2009

(65) Prior Publication Data

US 2009/0231302 A1 Sep. 17, 2009

(30) Foreign Application Priority Data

Mar. 14, 2008 (TW) ................................ 97109143 A (51) Int. Cl.
*G09G 5/00* (2006.01)
*G06F 3/041* (2006.01)

(52) U.S. Cl.
USPC ............ 345/156; 345/173; 345/174; 200/600

(58) Field of Classification Search
USPC .......................................... 345/174; 200/600
See application file for complete search history.

(56) References Cited

U.S. PATENT DOCUMENTS

| | | | | |
|---|---|---|---|---|
| 4,394,643 A * | 7/1983 | Williams | | 341/33 |
| 5,914,465 A | 6/1999 | Allen et al. | | |
| 6,184,871 B1 * | 2/2001 | Teres et al. | | 345/173 |
| 6,297,811 B1 | 10/2001 | Kent et al. | | |
| 7,504,833 B1 * | 3/2009 | Seguine | | 324/672 |
| 7,557,590 B2 * | 7/2009 | Yakabe | | 324/686 |
| 7,825,832 B2 * | 11/2010 | Nishimura et al. | | 341/5 |
| 2003/0210809 A1 * | 11/2003 | Kim | | 382/124 |
| 2005/0099188 A1 * | 5/2005 | Baxter | | 324/678 |
| 2008/0036473 A1 | 2/2008 | Jansson | | |
| 2008/0142281 A1 * | 6/2008 | Geaghan | | 178/18.06 |
| 2008/0165134 A1 * | 7/2008 | Krah | | 345/173 |
| 2008/0179112 A1 * | 7/2008 | Qin et al. | | 178/18.06 |
| 2008/0309623 A1 * | 12/2008 | Hotelling et al. | | 345/173 |
| 2009/0045822 A1 * | 2/2009 | Nosovitsky et al. | | 324/686 |

FOREIGN PATENT DOCUMENTS

JP 09-018321 1/1997

OTHER PUBLICATIONS

Maeda, K. et al., "P-174L: Late-News Poster: The System-LCD with Monolithic Ambient-Light Sensor System", SID '05 Digest, pp. 356-359.

* cited by examiner

*Primary Examiner* — Bipin Shalwala
*Assistant Examiner* — Benyam Ketema
(74) *Attorney, Agent, or Firm* — Liu & Liu (57) ABSTRACT

A control circuit for a touch panel including a capacitor module coupled to a node. The control circuit includes a power supply, a discharging unit, and a compared unit. The power supply provides a voltage to the node. The discharging unit discharges the node. The compared unit generates an output signal according to the voltage of the node.

12 Claims, 9 Drawing Sheets

CONTROL METHOD, CIRCUIT, AND ELECTRONIC SYSTEM UTILIZING THE SAME

CROSS REFERENCE TO RELATED APPLICATIONS

This application claims priority of Taiwan Patent Application No. 097109143, filed on Mar. 14, 2008, the entirety of which is incorporated by reference herein.

BACKGROUND OF THE INVENTION

1. Field of the Invention

The invention relates to a control circuit, and more particularly to a control circuit for a touch panel.

2. Description of the Related Art

To communicate information, conventional computers or work stations utilize keyboards or a mouse to serve as input devices. However, the input devices of the conventional computers or work stations cannot speedily transmit or change certain types of information formats.

With the development of technology, input devices for electronic products have achieved great diversity. Among the various input devices, touch panels have been widely used as main input devices and are gradually replacing the conventional input devices.

BRIEF SUMMARY OF THE INVENTION

According to the invention, control methods and control circuits for touch panels are provided. The touch panel comprises a capacitor module coupled to a node. An exemplary embodiment of a control method comprises: providing a voltage to the node during a first period; discharging the node during a second period; and generating an output signal according to the voltage of the node.

An exemplary embodiment of a control circuit comprises a power supply, a discharging unit, and a compared unit. The power supply provides a voltage to the node. The discharging unit discharges the node. The compared unit generates an output signal according to the voltage of the node.

Electronic systems are also provided. An exemplary embodiment of an electronic system comprises a power converter and a touch panel. The power converter generates an operation power. The touch panel receives the operation power and comprises a capacitor module and a control circuit. The capacitor module is coupled to a node. The control circuit controls the voltage of the node and comprises a power supply, a discharging unit, and a compared unit. The power supply provides a voltage to the node. The discharging unit discharges the node. The compared unit generates an output signal according to the voltage of the node.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
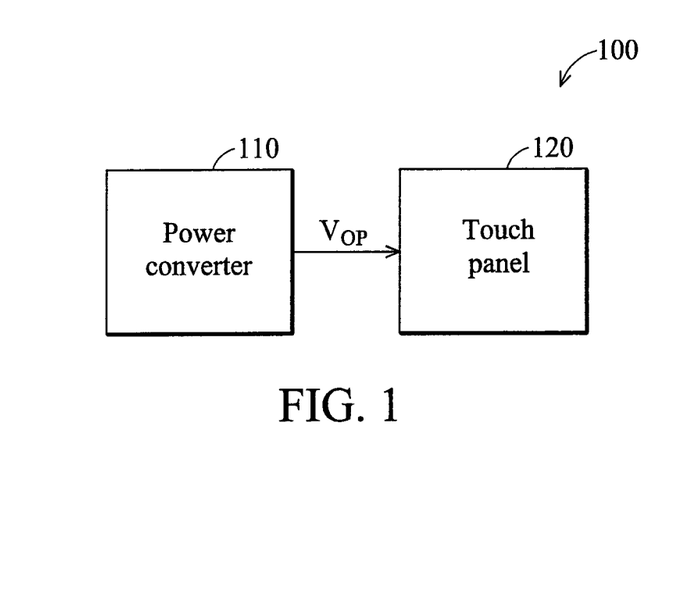
FIG. 1 is a schematic diagram of an exemplary embodiment of an electronic system according to the present invention.

FIG. 1 is a schematic diagram of an exemplary embodiment of an electronic system. The electronic system 100 can be a personal digital assistant (PDA), a cellular phone, a digital camera, a television, a global positioning system (GPS), a car display, an avionics display, a digital photo frame, a notebook computer (NB), or a personal computer (PC). As shown in FIG. 1, the electronic system 100 comprises a power converter 110 and a touch panel 120. The power converter 110 generates an operation power $V_{OP}$. The touch panel 120 receives the operation power $V_{OP}$ and displays images. In one embodiment, the power converter 110 can be a converter for transforming an alternating current (AC) to a direct-current (DC) or a DC to a DC.

Figure 2:
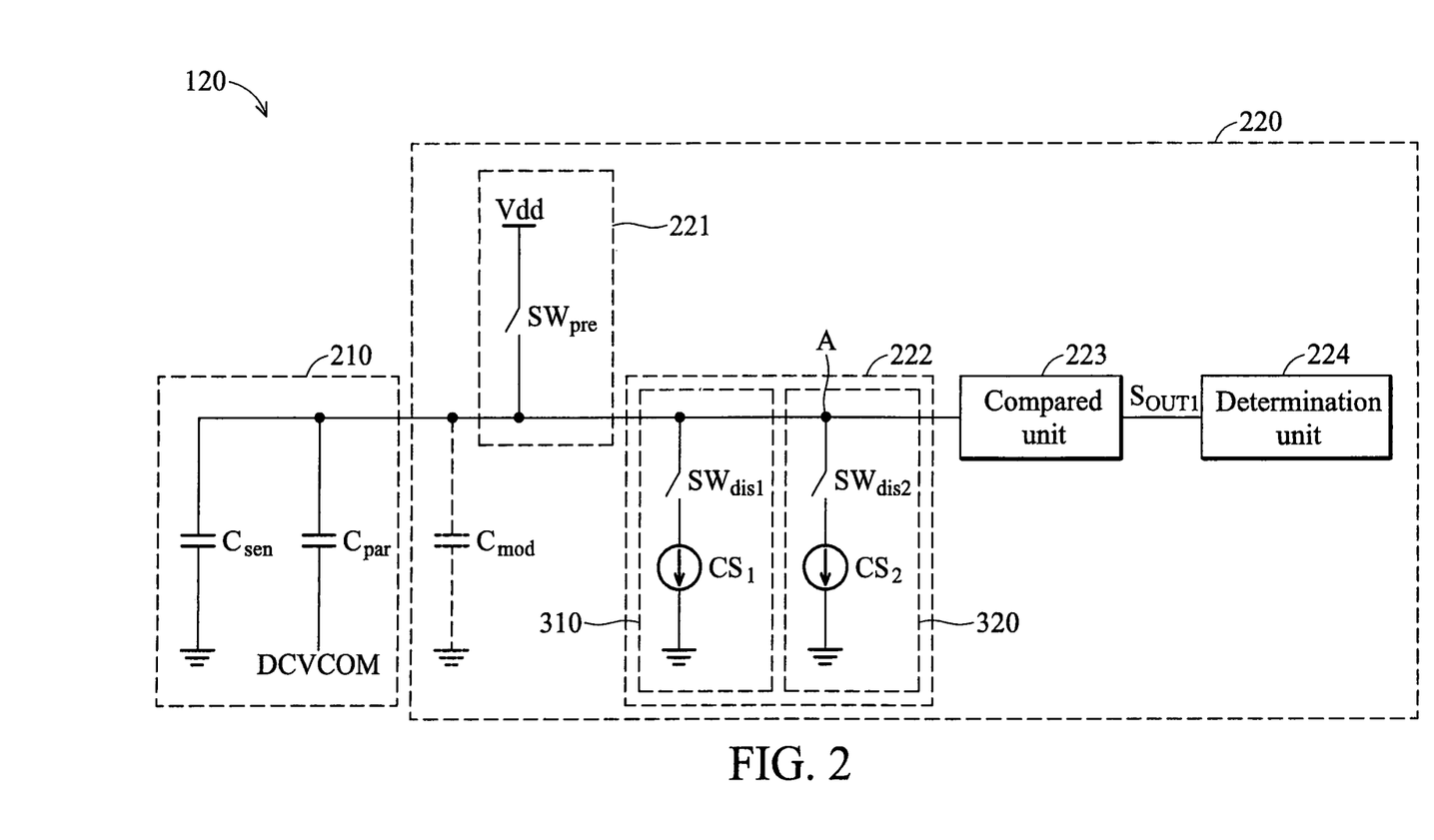
FIG. 2 is a schematic diagram of an exemplary embodiment of a touch panel according to the present invention.

FIG. 2 is a schematic diagram of an exemplary embodiment of a touch panel. The touch panel 120 comprises a capacitor module 210 and a control circuit 220. In one embodiment, the capacitor module 210 and a color filter (not shown) of the touch panel 120 are disposed on a substrate. In other embodiments, the capacitor module 210 is disposed on a substrate and the color filter is disposed on another substrate. Since the color filter is well known to those skilled in the field, the description of the color filter is omitted for brevity. In other embodiments, the control circuit 220 is integrated into a chip.

In this embodiment, the touch panel 120 is a capacitive touch panel. When the touch panel 120 is not touched, the capacitor module 210 only comprises a parasitic capacitor $C_{par}$. When the touch panel 120 is touched, the capacitor module 210 comprises the parasitic capacitor $C_{par}$ and a detection capacitor $C_{sen}$. The capacitance of the detection capacitor $C_{sen}$ is determined by the touched area. When the touched area is larger, the capacitance of the detection capacitor $C_{sen}$ is higher. Thus, the capacitance of the capacitor module 210 is increased.

Since the capacitor module 210 is coupled to a node A, the voltage of the node A relates to the capacitance of the capacitor module 210. When the capacitance of the capacitor module 210 is higher, the capacitor module 210 can store more charges. The voltage of the node A is higher.

In this embodiment, the control circuit 220 comprises a compensating capacitor $C_{mod}$, a power supply 221, a discharging unit 222, a compared unit 223, and a determination unit 224. Different touch panels may comprise of different capacitances in parasitic capacitors due to manufacturing procedures. Thus, the compensating capacitor $C_{mod}$ is utilized to compensate for the parasitic capacitors. In other embodiments, the compensating capacitor $C_{mod}$ can be omitted.

The power supply 221 provides voltage VDD to the node A. When a pre-charge switch $SW_{pre}$ is turned on, the node A can receive the voltage VDD. In this embodiment, since the voltage VDD is a DC voltage, one terminal of the parasitic capacitor $C_{par}$ receives common voltage ($V_{com}$) DCVCOM. The common voltage is well known to those skilled in the field such that the description of the common voltage is omitted.

During a first period, the pre-charge switch $SW_{pre}$ of the power supply 221 is turned on for charging the capacitor module 210. At this time, the voltage of the node A is increased. In one embodiment, when the voltage of the node A arrives at a first preset value, the pre-charge switch $SW_{pre}$ is turned off to stop charging the capacitor module 210. In another embodiment, when the voltage of the node A arrives at the first preset value and the duration, that the voltage of the node A arrives at the first preset value, arrives at a preset timing, the pre-charge switch $SW_{pre}$ is turned off.

During a second period, the discharging unit 222 discharges the node A. In this embodiment, the discharging unit 222 comprises modules 310 and 320 for executing two discharging stages. The module 310 discharges the node A by a first current. The module 320 discharges the node A by a second current less than the first current. In some embodiments, only one module discharges the node A. Thus, the node A is discharged by a single current.

In this embodiment, each the modules 310 and 320 comprises a discharging switch and a current source. When the discharging switch $SW_{dis1}$ of the module 310 is turned on, the current source $CS_1$ makes the node A discharge with a first current. When the discharging switch $SW_{dis2}$ of the module 320 is turned on, the current source $CS_2$ makes the node A discharge with a second current. When the node A is discharged by the first current and the duration, the node A is discharged by the first current, arrives at a preset timing, the node A is discharged by the second current. When the node A is discharged by the second current and the voltage of the node A is less than a second preset value, the discharging switch $SW_{dis2}$ is turned off to stop discharging the node A.

The compared unit 223 generates an output signal $S_{OUT1}$ according to the voltage of the node A. Thus, if the voltage of the node A exceeds the first preset value during the first period, a first transition occurs in the output signal $S_{OUT1}$ generated by the compared unit 223. Thus, the output signal $S_{OUT1}$ comprises a first edge. If the voltage of the node A is less than the second preset value during the second period, a second transition occurs in the output signal $S_{OUT1}$ generated by the compared unit 223. Thus, the output signal $S_{OUT1}$ comprises a second edge opposite to the first edge. For example, if the first edge is a rising edge, the second edge is a falling edge.

The time points for occurrence of the first and the second transitions are determined by the capacitance of the capacitor module 210. In this embodiment, the time points for occurrence of the first and the second transitions are detected by the determination unit 224. When the touch panel 120 is touched, the capacitance of the capacitor module 210 is higher causing a longer timing difference between the first and the second transitions. When the touch panel 120 is not touched, the capacitance of the capacitor module 210 is smaller causing a shorter timing difference between the first and the second transitions. Therefore, it is obtained whether the touch panel 120 is touched or not according to the timing difference between the first and the second transitions.

For example, when the timing difference between the first and the second transitions of the output signal $S_{OUT1}$ exceeds a preset value, it represents that the touch panel 120 is touched. When the timing difference between the first and the second transitions of the output signal $S_{OUT1}$ is less than the preset value, it represents the touch panel 120 is not touched. In other embodiments, the determination unit 224 can be omitted or integrated into other processing unit (not shown).

Figure 3A:
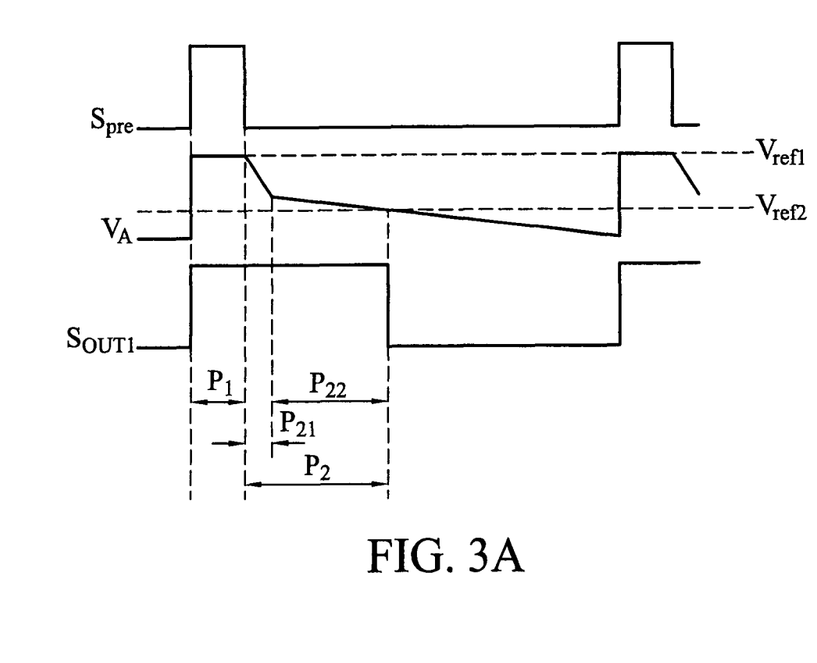
FIG. 3A is a schematic diagram of the output signal $S_{OUT1}$ when the touch panel is not touched.

FIG. 3A is a schematic diagram of the output signal $S_{OUT1}$ when the touch panel is not touched. Referring to FIG. 2, since a charging signal $S_{pre}$ is at a high level during a period $P_1$, the pre-charge switch $SW_{pre}$ is turned on. When the voltage $V_A$ of the node A arrives at a preset value $V_{ref1}$, the output signal $S_{OUT1}$ occurs a first transition. In this embodiment, the output signal $S_{OUT1}$ is changed from a low level to a high level.

Since the charging signal $S_{pre}$ is at a low level during a period $P_2$, the pre-charge switch $SW_{pre}$ is turned off. During a period $P_{21}$, the discharging switch $SW_{dis1}$ is turned on such that the voltage $V_A$ of the node A is reduced. During a period $P_{22}$, the discharging switch $SW_{dis2}$ is turned on such that the voltage $V_A$ of the node A is continuously reduced. When the voltage $V_A$ of the node A arrives at a preset value $V_{ref2}$, occurrence of the output signal $S_{OUT1}$ is at a second transition. Additionally, since the node A is discharged by a larger current during the period $P_{21}$, the falling slope is steeper. During the period $P_{22}$, since the node A is discharged by a smaller current, the falling slope is more gradual.

Figure 3B:
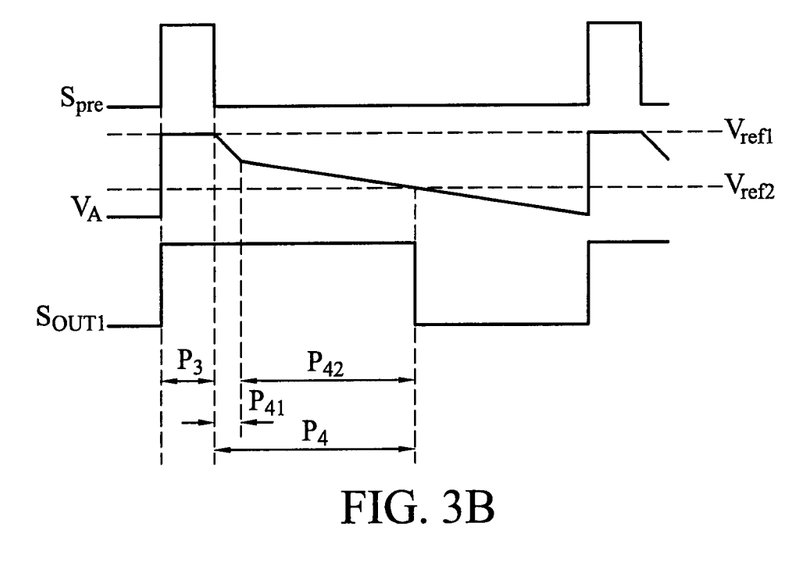
FIG. 3B is a schematic diagram of the output signal $S_{OUT1}$ when the touch panel is touched.

FIG. 3B is a schematic diagram of the output signal $S_{OUT1}$ when the touch panel is touched. Since the touch panel 120 is touched, the capacitor module 210 has a larger capacitance. Thus, a larger discharging time is required such that the voltage $V_A$ of the node A is less than the preset value $V_{ref2}$. Therefore, the pulse width of the output signal shown in FIG. 3B is larger than the pulse width of the output signal shown in FIG. 3A.

The change of the output signal $S_{OUT1}$ is described in greater detail with reference to FIG. 3B. During a period $P_3$, since the charging signal $S_{pre}$ is at a high level, the pre-charge switch $SW_{pre}$ is turned on. When the voltage $V_A$ of the node A arrives at the preset value $V_{ref1}$, occurrence of the output signal $S_{OUT1}$ is at a first transition. In this embodiment, the output signal $S_{OUT1}$ is changed from a low level to a high level.

Since the charging signal $S_{pre}$ is at a low level during a period $P_4$, the pre-charge switch $SW_{pre}$ is turned off. During a period $P_{41}$, the discharging switch $SW_{dis1}$ is turned on such that the voltage $V_A$ of the node A is reduced. During a period $P_{42}$, the discharging switch $SW_{dis2}$ is turned on such that the voltage $V_A$ of the node A is continuously reduced. When the voltage $V_A$ of the node A arrives at a preset value $V_{ref2}$, occurrence of the output signal $S_{OUT1}$ is at a second transition. In this embodiment, it is obtained whether the touch panel is touched or not according to the duration, that the output signal $S_{OUT1}$ is at the high level.

Figure 4:
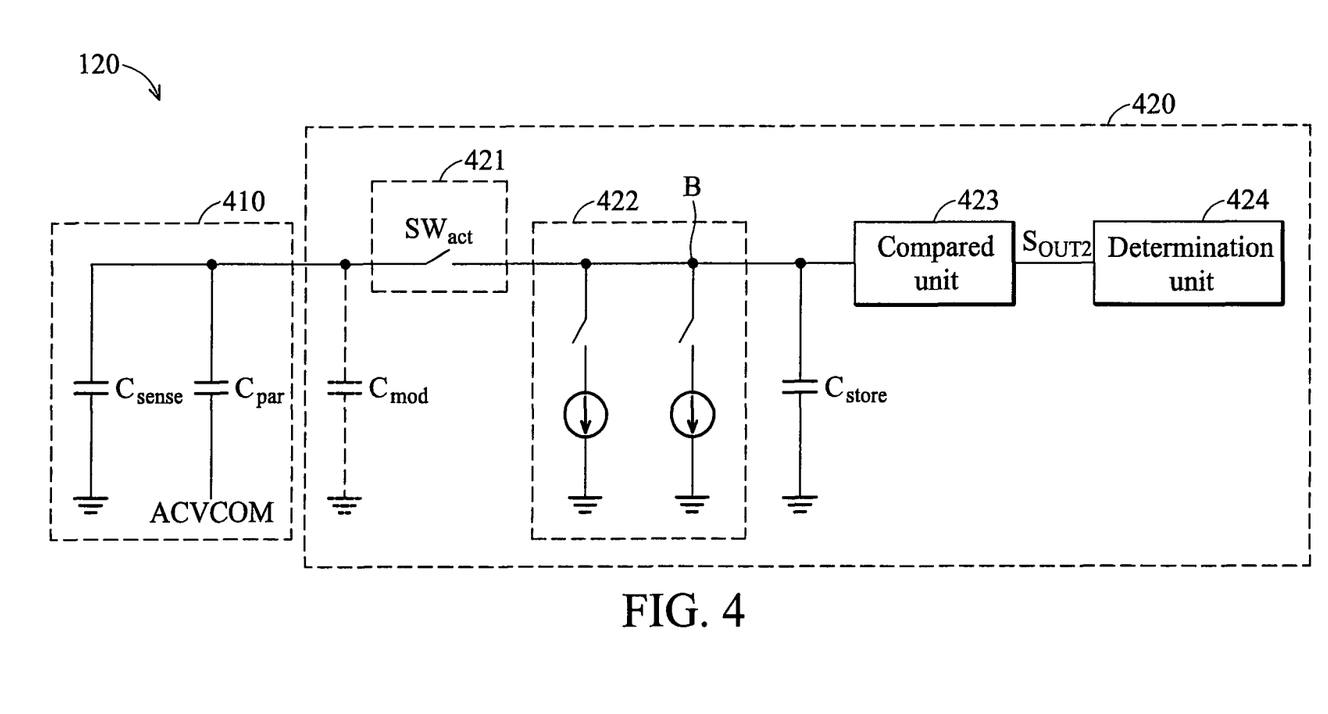
FIG. 4 is a schematic diagram of another exemplary embodiment of the touch panel according to the present invention.

FIG. 4 is a schematic diagram of another exemplary embodiment of the touch panel. The touch panel 120 comprises a capacitor module 410 and a control circuit 420. Since the capacitor module 410 is similar to the capacitor module 210, the description of the capacitor module 410 is omitted. In this embodiment, the control circuit 420 comprises a power supply 421, a discharging unit 422, a compared unit 423, and a determination unit 424. Since the discharging unit 422, the compared unit 423, and the determination unit 424 are similar to the discharging unit 222, the compared unit 223, and the determination unit 224, the descriptions of the discharging unit 422, the compared unit 423, and the determination unit 424 are omitted.

Figure 5A:
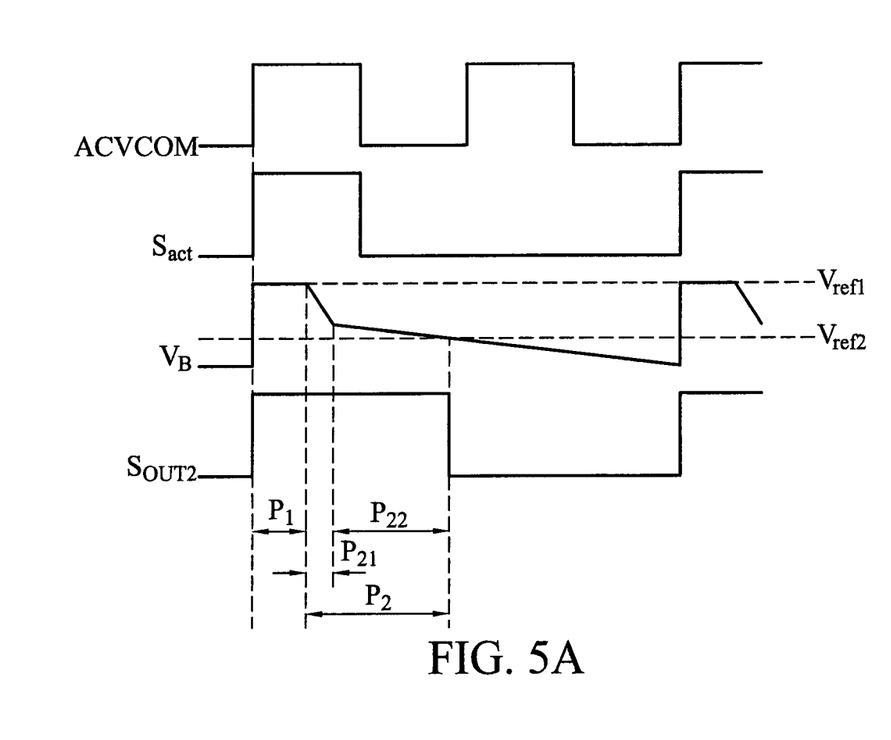
FIG. 5A is a schematic diagram of the output signal $S_{OUT2}$ when the touch panel is not touched.

In this embodiment, an AC voltage ACVCOM (shown in FIG. 5A) is utilized to charge the capacitor module 410. Referring to FIG. 5A, when the AC voltage ACVCOM is at a high level, an activation switch $SW_{act}$ of the power supply 421 is turned on. At this time, the AC voltage ACVCOM charges the capacitor module 410 and a storage capacitor $C_{store}$. Thus, the voltage $V_B$ of a node B arrives at a preset value $V_{ref1}$. Since the capacitor module 410 is coupled to the node B and the node B is coupled to the storage capacitor $C_{store}$, the voltage of the storage capacitor $C_{store}$ equals to the voltage of the capacitor module 410. The voltage of the storage capacitor $C_{store}$ reacts to the node B. When the voltage $V_B$ of the node B arrives at the preset value $V_{ref1}$, an output signal $S_{OUT2}$ occurs a first transition.

When the AC voltage ACVCOM is at a low level, an activation switch $SW_{act}$ of the power supply 421 is turned off. At this time, the node B is discharged by the discharging unit 422. When the voltage $V_B$ of a node B is less than a preset value $V_{ref2}$, occurrence of the output signal $S_{OUT2}$ is at a second transition. Thus, it is obtained whether the touch panel is touched or not according to the timing difference between the first and the second transitions.

Figure 5B:
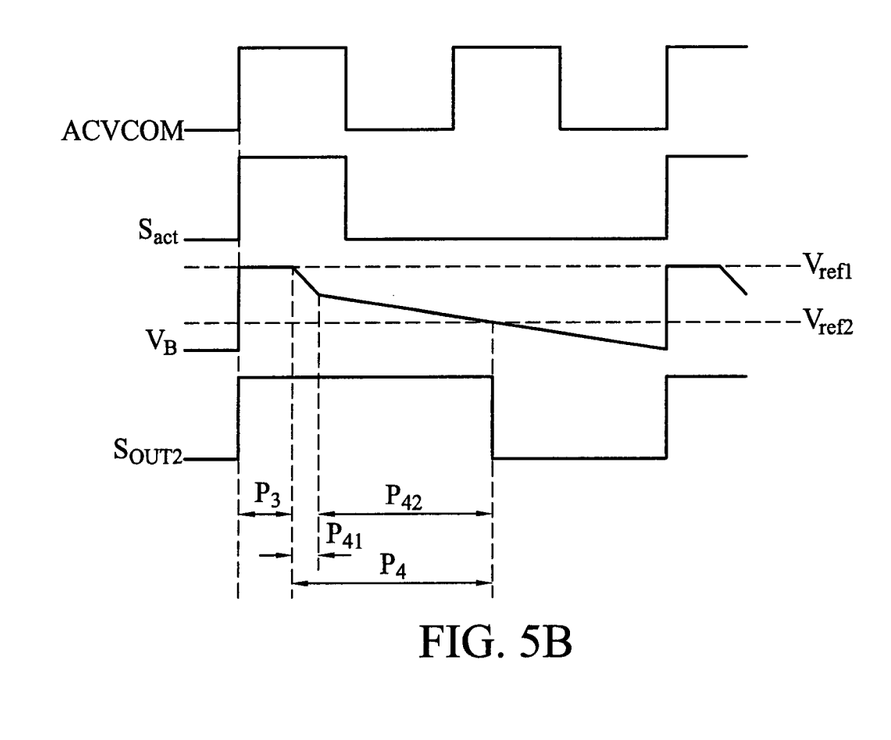
FIG. 5B is a schematic diagram of the output signal $S_{OUT2}$ when the touch panel is touched.

FIG. 5A is a schematic diagram of the output signal $S_{OUT2}$ when the touch panel is not touched. FIG. 5B is a schematic diagram of the output signal $S_{OUT2}$ when the touch panel is touched. FIGS. 5A and 5B are similar to FIGS. 4A and 4B such that the descriptions of FIGS. 5A and 5B are omitted. When a DC voltage or an AC voltage is utilized to charge the capacitor module, it is obtained whether the touch panel is touched or not according to the output signal.

Figure 6A:
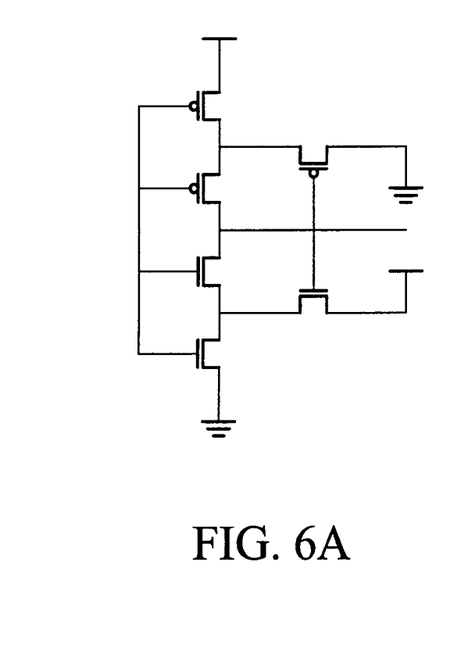
FIGS. 6A and 6B are schematic diagrams of the compared unit.
Figure 6B:
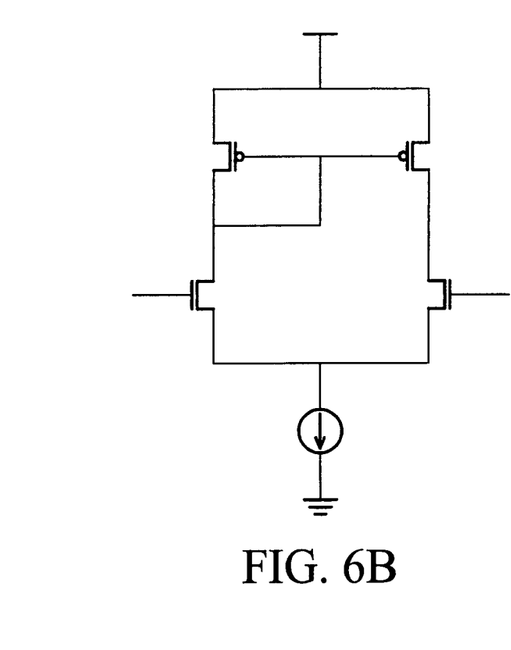

FIGS. 6A and 6B are schematic diagrams of the compared unit. The compared unit shown in FIG. 6A is a Schmitt trigger comparator. The compared unit shown in FIG. 6B is a difference pair comparator.

Figure 7:
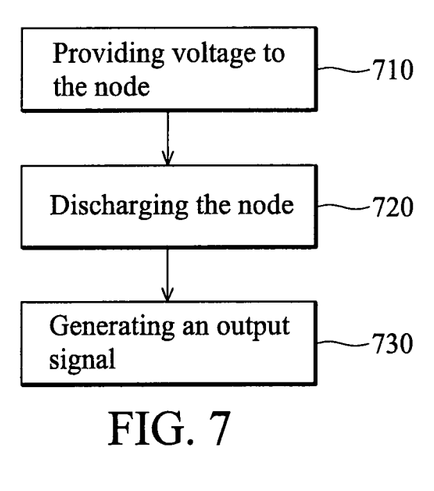
FIG. 7 is a flowchart of a control method.

FIG. 7 is a flowchart of a control method according to the invention. The control method can be applied in a touch panel. The touch panel comprises a capacitor module coupled to a node. During a first period, a voltage is provided to the node (step 710). The voltage may be a DC voltage or an AC voltage. Since the capacitor module is coupled to the node, when the voltage is provided to the node, the node is charged by the voltage. Thus, the voltage of the node is increased. In other embodiments, when the voltage of the node arrives at a first preset value, the voltage stops charging the node.

During a second period, the node is discharged (step 720). In one embodiment, the node is discharged by a first current. When the duration, that the node is discharged by the first current, arrives at a preset timing, the node is discharged by a second current less than the first current. In another embodiment, the node is discharged by a single current.

An output signal is generated according to the voltage of the node (step 730). In this embodiment, when the step 710 is executed, the voltage of the node is increased. When the voltage of the node arrives at a first preset value, occurrence of the output signal is at a first transition. When the step 720 is executed, the voltage of the node is reduced. When the voltage of the node is less than a second preset value, occurrence of the output signal is at a second transition. Thus, it is obtained whether the touch panel is touched or not according to the timing difference between the first and the second transitions.

If the touch panel is touched, the capacitance of the capacitor module is increased. Thus, when the capacitor module executes a charging action and a discharging action, the capacitance of the capacitor module is obtained according to the charging result and the discharging result. If the sum of the charging time and the discharging time exceeds a preset value due to the capacitance of the capacitor module being increased, it represents that the touch panel is touched. Similarly, if the sum of the charging time and the discharging time is less than the preset value due to the capacitance of the capacitor module being reduced, it represents that the touch panel is not touched.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a touch panel, which comprises a capacitor module coupled to a node, comprising:
   providing a voltage to the node during a first period;
   discharging the node during a second period; and
   generating an output signal according to the voltage of the node;
   wherein the node is discharged by a first current during the second period,
   wherein the node is discharged by a second current when the duration, that the node is discharged by the first current, arrives at a preset timing,
   wherein a first transition occurs in the output signal when the voltage of the node arrives at a first preset value and a second transition occurs in the output signal when the voltage of the node is less than a second preset value; and
   wherein the touch panel is touched or not according to the timing difference between the first and the second transitions.

2. The control method as claimed in claim 1, wherein the voltage is not provided to the node when the voltage of the node arrives at the first preset value.

3. The control method as claimed in claim 1, wherein the second current is less than the first current.

4. The control method as claimed in claim 3, wherein the node is not discharged when the voltage of the node is less than the second preset value.

5. A control circuit for a touch panel comprising a capacitor module coupled to a node, comprising:
   a power supply providing a voltage to the node;
   a discharging unit discharging the node; and
   a compared unit generating an output signal according to the voltage of the node
   wherein the discharging unit comprises a first module to discharge the node by a first current and a second module to discharge the node by a second current which is less than the first current,
   wherein a first transition occurs in the output signal when the voltage of the node arrives at a first preset value and a second transition occurs in the output signal when the voltage of the node is less than a second preset value.

6. The control circuit as claimed in claim 5, further comprising a determination unit, wherein the determination unit obtains whether the touch panel is touched or not according to a timing difference between the first and the second transitions.

7. The control circuit as claimed in claim 6, wherein the node is discharged by the second current when the duration, that the node is discharged by the first current, arrives at a preset timing.

8. The control circuit as claimed in claim 7, wherein the second module stops discharging the node when the node is discharged by the second current and the voltage of the node is less than the second preset value.

9. An electronic system, comprising:
- a power converter generating an operation power; and
- a touch panel receiving the operation power and comprising:
  - a capacitor module coupled to a node; and
  - a control circuit controlling the voltage of the node and comprising:
    - a power supply providing a voltage to the node;
    - a discharging unit discharging the node; and
    - a compared unit generating an output signal according to the voltage of the node wherein the discharging unit comprises a first module to discharge the node by a first current and a second module to discharge the node by a second current which is less than the first current,
  - wherein a first transition occurs in the output signal when the voltage of the node arrives at a first preset value and a second transition occurs in the output signal when the voltage of the node is less than a second preset value, and wherein the electronic system further comprises a determination unit obtaining whether the touch panel is touched or not according to a timing difference between the first and the second transitions.

10. The electronic system as claimed in claim 9, wherein the second module stops discharging the node when the node is discharged by the second current and the voltage of the node is less than the second preset value.

11. The electronic system as claimed in claim 10, wherein the node is discharged by the second current when the duration, that the node is discharged by the first current, arrives at a preset timing.

12. An electronic system as claimed in claim 9, wherein the touch panel further comprises a color filter and the color filter and the capacitor module are disposed on a substrate.

* * * * *